Patented Sept. 8, 1953

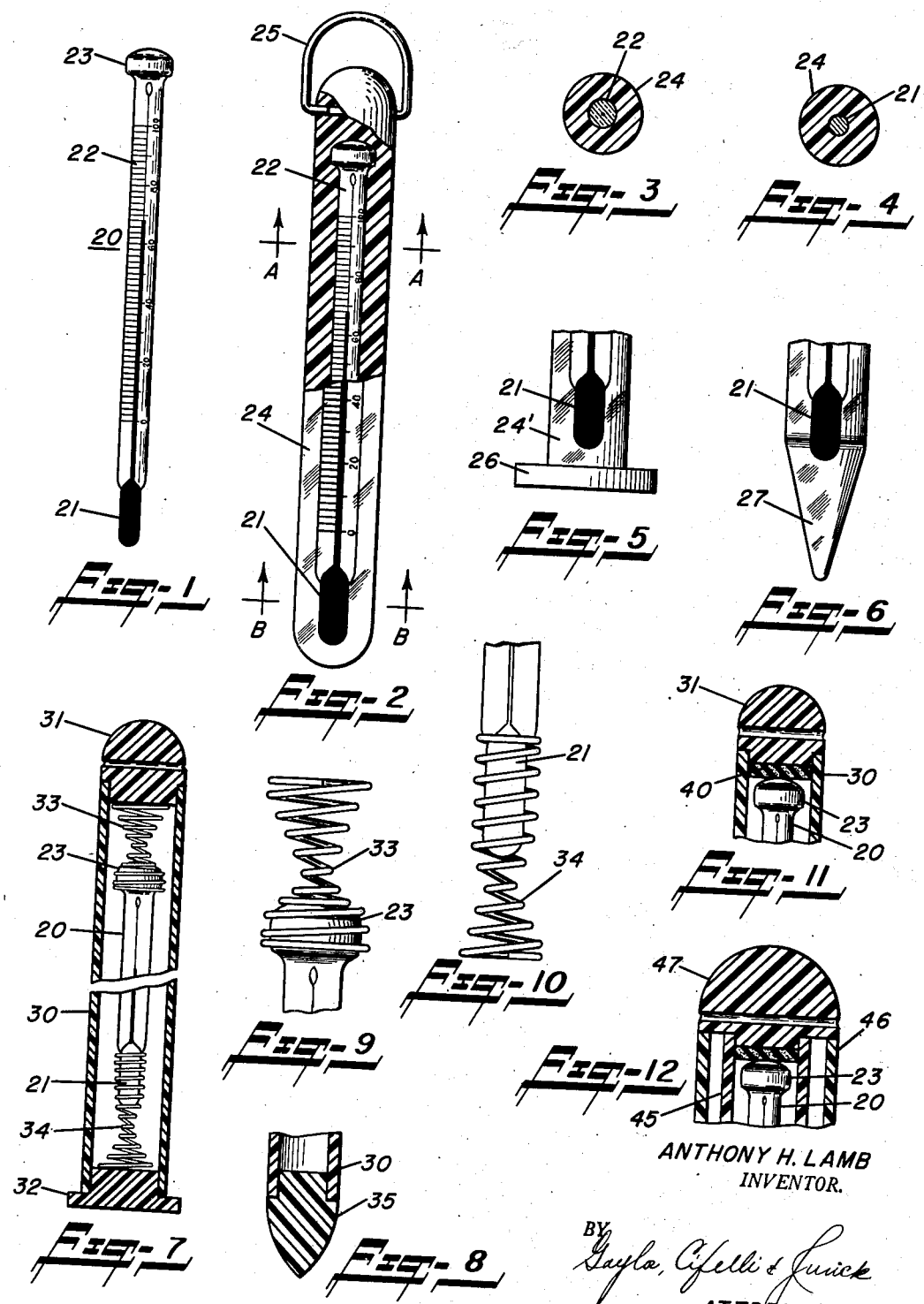

2,651,203

UNITED STATES PATENT OFFICE 2,651,203

TEMPERATURE INDICATOR

Anthony H. Lamb, Hillside, N. J., assignor to Weston Electrical Instrument Corporation, Newark, N. J., a corporation of New Jersey Application October 3, 1950, Serial No. 188,149

5 Claims. (Cl. 73—374)

This invention relates to thermometers and more particularly to a glass thermometer provided with a novel housing that serves to protect the thermometer and facilitate the use of same under conditions wherein the use of the ordinary glass thermometer is subject to practical difficulties, inconvenience and even hazard.

A glass thermometer, especially of the etched stem type, provides an accuracy of indication and a permanence of calibration exceeding that of other conventional temperature indicators. However, glass stem thermometers are fragile and require care in use and storage. In certain uses, wherein the glass thermometer excels, various factors other than, or in addition to, the possibility of breakage, have presented obstacles and disadvantages requiring compensating measures which, unfortunately, are not complete and satisfactory solutions to the problem.

When a glass thermometer is used to check the temperature of food, numerous problems arise. In the first place, the thermometer must be absolutely sanitary in order not to contaminate the product. The calibration and numeral markings on the thermometer stem are formed by etching the glass and it is difficult to completely remove bacteria and foreign matter from such relatively small recesses. Consequently, when such thermometer is used to check the temperature of selected containers of certain food, such as ice cream, the test unit of the product is not permitted to be sold for human consumption. In other instances where the degree of such product contamination is considered insufficient to warrant a forced disposal of the product, great care must be exercised to prevent breakage of the thermometer in or near the product as the mercury contained within the thermometer is poisonous. It will be apparent both these problems become aggravated when the product is a semi-solid such as soft cheese, potato salad, fats, etc. One proposed solution of these problems comprises a pointed metal sheath inserted over the bulb end of the thermometer. However, the length of such sheath is limited to the point where it does not obstruct the readings of the spirit column over the required temperature range. Further, bacterial and foreign matter can collect between the sheath and the thermometer stem. Still further, inasmuch as the metallic sheath overlies only a relatively small portion of the total length of the thermometer the user is lulled into a false sense of security and often the application of a relatively small lever action causes the glass stem to snap at the edge of the sheath.

When a glass thermometer is used to measure the temperature of a cold chamber, such as a refrigerator, removal of the thermometer from such cold atmosphere causes immediate fogging of the surface. Wiping the thermometer to remove the condensed moisture causes a change in the temperature reading. This problem, of course, does not exist in cases where the user may enter the cold chamber or where the thermometer may be read without removal from the temperature station, but such conditions do not obtain in all instances where low temperature readings are required.

When the glass thermometer is used to make periodic checks of the temperature of a fluid within a large storage tank there is presented the problem of how to accomplish this conveniently and accurately. For example, aviation gasoline is stored in tanks having a height as great as 100 feet and to obtain a temperature reading when the level of the contained liquid is, say, 10 feet, the thermometer is tied to a string and lowered into the liquid through the roof hatch. To reduce the change in reading during the time required to hoist the thermometer to the top of the tank it is now customary to provide a cup around the thermometer whereby a small quantity of the liquid is brought up with the thermometer, such liquid serving to delay the change in the indication of the thermometer until a reading can be taken. When one considers the precarious position of individual, the factor of cold and inclement weather conditions, and the gas fumes escaping from the hatch, the unsatisfactory character of such operation becomes apparent.

The above conditions attending the use of a glass thermometer in certain applications are presented as examples to illustrate practical problems confronting a user. Many others could be included. A thermometer made in accordance with this invention overcomes such disadvantages, as will be apparent from the following description.

An object of this invention is the provision of a glass thermometer provided with a housing which serves to protect the thermometer from physical damage and which prevents contamination of the product in the event the thermometer is broken in use.

An object of this invention is the provision of a glass thermometer contained within a transparent housing constructed to facilitate the use of the thermometer and including means protecting the thermometer against damage due to mechanical shock.

An object of this invention is the provision of a housing for a glass thermometer, said housing serving as a means for magnifying the thermometer indications, for protecting the thermometer against shock, for facilitating the insertion of the thermometer into semi-solids, and for delaying a change in the thermometer indication with changes in temperature.

An object of this invention is the provision of a temperature indicator comprising a glass thermometer, a transparent, plastic housing completely surrounding the thermometer, said housing including means for suspending the thermometer and means for supporting the thermometer in an upright position.

An object of this invention is the provision of a temperature indicator comprising a transparent circular housing having an axial bore therethrough, a glass thermometer in said axial bore said thermometer spaced from the walls of said bore, closure caps sealing both ends of the housing, energy-absorbing means disposed between the said caps and the thermometer, and a fluid substantially filling the resulting closed housing.

These and other objects and advantages will be apparent from the following description when taken with the accompanying drawings illustrating several embodiments of the invention. The drawings are for purposes of illustration and are not to be construed as defining the scope or limits of the invention, reference being had for the latter purpose to the appended claims.

In the drawings wherein like reference characters denote like parts in the several views:

Figure 1 illustrates a glass thermometer of conventional construction;

Figure 2 illustrates the glass thermometer molded within a transparent plastic, circular housing;

Figure 3 is a transverse section taken along the line A—A of Figure 2;

Figure 4 is a transverse section taken along the line B—B of Figure 2;

Figure 5 is a fragmentary view showing a modified end on the housing;

Figure 6 is a fragmentary view illustrating another form of the housing end;

Figure 7 is a longitudinal, central section of another form of housing for the glass thermometer and including shock-absorbing springs at each end of the thermometer;

Figure 8 is a fragmentary, sectional view showing a tapered-plug at one end of the housing;

Figure 9 is an enlarged, elevation view of the upper spring disposed between the head of the thermometer and the top plug of the Figure 7 construction;

Figure 10 is a similar view of the lower spring;

Figure 11 is a fragmentary, longitudinal, sectional view of the upper end of the housing and showing a resilient washer disposed between the thermometer and the plug; and Figure 12 is a fragmentary, longitudinal, central section of another embodiment of the invention wherein the housing comprises a plurality of radially-spaced, transparent plastic tubes.

Referring now to Figure 1, there is shown a glass thermometer 20 of conventional construction and comprising a thin-walled, fluid carrying bulb 21 at one end, a stem 22 carrying the calibration markings and numerals, and a head 23. The calibration marks and the numerals are formed by etching the stem surface after which the resulting recesses may be made more readily visible by filling same with a suitably-colored paint, wax or etc. Thermometers of this class are made in a variety of lengths, temperature ranges and head formation and it is here pointed out that any such specific glass thermometer may be used to provide a novel temperature indicator made in accordance with this invention. It may also here be pointed out that the expansible liquid used in a great majority of such thermometers is mercury, that the glass stem and particularly the bulb are fragile and easily broken, and that the etched calibration marks and numbers, even when filled with a suitable medium, retain bacteria and foreign matter that is difficult, if not impossible, to remove completely.

One embodiment of my invention is shown in Figure 2 wherein part of the protective housing is broken away for purposes of clarity of understanding. The glass thermometer is molded directly in a transparent plastic that forms a circular housing 24 completely encasing the thermometer. This may be accomplished by suspending the thermometer within a mold and filling the remainder of the mold cavity with a liquid plastic. Polymerization of the plastic may be brought about by the application of external heat or by exothermic reaction between the plastic and a suitable catalyst, as is well known. After the plastic has been polymerized the resulting solid housing may further be shaped to desired contour and, if necessary, the surface may be polished. A transverse hole is drilled at the upper end of the housing to accommodate a wire loop 25 which serves as a convenient means for suspending the device and also to prevent its rolling on a smooth, inclined surface.

Figures 3 and 4 are transverse sections taken along the lines A—A and B—B, respectively, of Figure 2 and show the complete imbedding of the glass thermometer within the plastic. By making the housing of clear plastic having a circular section the calibration marks, numerals, and spirit column of the thermometer are magnified, promoting ease and accuracy of reading. As is well known, the thermo-plastic materials are somewhat resilient and this characteristic of the housing 24 offers a certain degree of protection for the glass thermometer with respect to what might be termed light mechanical shocks. More importantly, however, in the event the housing is subjected to a sharp blow sufficient to crack the housing, actual tests have shown that the mercury and glass chips resulting from breakage of the thermometer are retained within the housing. Thus, if such breakage occurs while the device is inserted in a food these harmful substances do not cause food contamination. Further, the plastic housing adds substantial strength to the unit as a whole whereby the device may be inserted into semi-solids and moved around therein as desired, without fear of breaking the fragile glass element. Admittedly, the device shown in Figure 2 possesses an inherent time lag but this is objectionable only in those relatively few instances where speed of response to temperature changes is important. On the other hand, the thermal lag inherent in a temperature indicator, made as described herein, is an advantage as in most uses there is available ample time for the spirit column to reach a steady, accurate indication of the surrounding temperature. When the reading of the thermometer requires its removal from product, or area, under test, the lag serves to delay a change in indication during the short time required to take the reading. The hereinabove given examples, specifically, obtaining temperature readings of cold chambers and of a liquid within a storage tank, will serve to emphasize the value of this time lag. Further, in such cases, the moisture, or liquid covering the device may be wiped off to improve readability and the lag provided by the plastic housing serves to prevent such cleaning action from changing the indication of the spirit level.

It will now be apparent a temperature indicator made as herein described has many intrinsic advantages and overcomes the numerous difficulties attending the use of a glass stem thermometer.

Figure 5 illustrates a modification of the lower end of the housing. In this case the plastic housing 24' has an end 26 of expanded area, such end being of either circular, square or other cross-sectional form, as desired. The end 26 serves as a base whereby the device will be self-supporting in a vertical position on a flat surface, such as the bottom of a vessel containing a still liquid. Also, this base may be used as a pestle for crushing and/or tamping material that must be maintained at a given temperature within a vessel or mixing chamber. Further, the enlarged end 26 serves to prevent rolling of the unit on an inclined surface when the suspending hook 25 is omitted.

Figure 6 illustrates another modification of the housing end when the device is designed specifically for use in measuring the temperature of dense materials. The lower end 27 of the housing is tapered, as shown, to facilitate penetration of the material. Those skilled in this art will also understand that such tapered end may be provided with an outer screw thread to facilitate insertion of the device into still denser objects, such as potatoes.

Another embodiment of the invention is shown in Figure 7 wherein the plastic housing 30 comprises a hollow tube having the ends closed by the plugs 31 and 32 which may also be made of plastic, or any other suitable material. Such plugs may be cemented to the tube to form a liquid-tight housing. The thermometer 20 is disposed within the bore and spaced from the side walls of the tube substantially, as shown. In order to retain the thermometer substantially centered relative to the tubing wall and to protect the thermometer against axially-applied mechanical shocks, I provide the coiled springs 33, 34. As shown more clearly in the enlarged, elevation views of Figures 9 and 10, the outer end of each spring has a diameter slightly smaller than that of the tube bore while the inner end of each spring is made to conform to the co-operating end of the thermometer. The outer and inner section of each spring is joined by convolutions of relatively small diameter and the entire complement of convolutions are spaced apart axially when the spring is in position within the housing. Thus, the inner section of the upper spring 33 conforms to the head 23 of the thermometer whereas the inner section of the lower spring 34 conforms to the bulb 21. In the latter case the end convolution of the spring 34 abuts against the shoulder formed between the thermometer stem and the bulb 21 while the adjacent convolutions encircle the bulb. The central convolutions of the spring are of reduced diameter and are contacted by the bulb when the glass thermometer moves axially in the direction of such reduced-diameter spring turns, as is apparent from Figure 10. The springs 33 and 34, therefore, provide good protection for the thermometer.

In the Figure 7 construction the housing may be filled with a liquid or gas to reduce the time lag of the device as contrasted to the solid housing construction shown in Figure 2, or to provide a time lag of predetermined magnitude, if such be desired. The filling of the tubular housing with a liquid also increases the degree of magnification to further facilitate the reading of the thermometer indications.

As explained with reference to Figure 5, the flat, end cap 32 serves to make the device self-supporting in a vertical position and may be used as a crushing or mixing tool. This end may, of course, be made in different sizes and forms to meet conditions peculiar to the use for which the device is intended as, for example, the pointed end cap 35 shown in Figure 8.

Another embodiment of the invention is shown in Figure 11, wherein the glass thermometer is spaced from the housing end caps by a disc of suitable resilient material. In Figure 11 there is shown the top disc 40, made of rubber, felt or etc., said disc fitting snugly within the tubular housing. A similar disc is disposed at the other end of the thermometer.

Figure 12 illustrates a temperature indicator of the general type already described but employing a multi-tube housing formed by concentrically disposed tubes of plastic. The glass thermometer is disposed within the inner, plastic tube 45 that is, in turn, disposed within the outer plastic tube 46 and spaced therefrom, as shown. The inner tube and the space between the two tubes, may be filled with liquid or gas as described with reference to Figure 7, and the tube ends may be sealed by suitable caps, such as the cap 47 to provide a liquid-tight device. Obviously, the glass thermometer may be spaced from the end caps by resilient discs or by coiled springs as described with reference to Figures 11 and 7, respectively.

From the above description of several specific embodiments of my invention the advantages of a temperature indicator so made may be summarized as follows.

1. The glass thermometer element is protected against breakage under conditions of use which would result in a fracture of such unprotected element.

2. In the event the device is subjected to relatively strong forces resulting in a fracture of the plastic housing, such housing prevents the mercury and glass chips from contaminating the material or substance being tested.

3. The plastic housing, with specially formed ends when necessary or desired, makes it possible to insert the unit into solid and semi-solid substances without the need for the exercise of extreme care by the user and without fear of breakage.

4. The sturdy housing makes it possible to use the device as a tool for crushing or mixing materials simultaneously with its use to indicate the temperature of such materials or mixtures.

5. The plastic housing provides a sanitary device by reason of its smooth, polished surface which may be cleaned with a cloth moistened with alcohol, or etc., prior to the actual insertion of the device into a critical substance such as food.

6. The reading of the thermometer indications are facilitated by reason of the magnifying effect of the round, transparent plastic housing.

7. The time lag, that is, the time required for spirit column of the glass thermometer to respond fully to a change in temperature at the exterior of the housing, is of distinct advantage in many, practical uses of the thermometer.

Having now described my invention in accordance with the patent statutes what I desire to secure by Letters Patent of the United States is set forth in the following claims.

I claim:

1. A temperature indicator comprising a first tube of transparent plastic, a glass thermometer disposed within the bore of the first tube, a second tube concentric with and spaced from the said first tube, end caps sealing the ends of both tubes, and energy-absorbing members disposed between each end of the thermometer and the adjacent end cap.

2. The invention as recited in claim 1, wherein the energy absorbing members comprise solid discs of resilient material.

3. The invention as recited in claim 1, wherein the energy absorbing members comprise coiled springs.

4. The invention as recited in claim 1, wherein the first tube and the space between both tubes is filled with a liquid.

5. The invention as recited in claim 1, wherein the space between the two tubes is filled with a liquid.

ANTHONY H. LAMB.

References Cited in the file of this patent

UNITED STATES PATENTS

| Number | Name | Date |
|---|---|---|
| 737,838 | Hirschberg | Sept. 1, 1903 |
| 1,216,827 | MacGregor | Feb. 20, 1917 |
| 1,729,298 | Stewart | Sept. 24, 1929 |
| 1,868,911 | Phelps | July 26, 1932 |
| 2,035,334 | Monrad | Mar. 24, 1936 |
| 2,072,441 | Cameron | Mar. 2, 1937 |
| 2,104,218 | Betzold et al. | Jan. 4, 1938 |
| 2,313,688 | Wappner et al. | Mar. 9, 1943 |
| 2,430,290 | Hann | Nov. 4, 1947 |

FOREIGN PATENTS

| Number | Country | Date |
|---|---|---|
| 26,321 | Sweden | Feb. 6, 1909 |
| 285,882 | Great Britain | Feb. 8, 1929 |
| 176,392 | Switzerland | Apr. 15, 1935 |
| 574,849 | Great Britain | Jan. 23, 1946 |